(12) United States Patent
Angleitner

(10) Patent No.: US 11,208,263 B2
(45) Date of Patent: Dec. 28, 2021

(54) STORAGE RACK FOR STORED GOODS AND STORAGE AND RETRIEVAL DEVICE FOR THE STORAGE AND RETRIEVAL OF THE STORED GOODS

(71) Applicant: Karl Angleitner, Hohenzell (AT)

(72) Inventor: Karl Angleitner, Hohenzell (AT)

( * ) Notice: Subject to any disclaimer, the term of this patent is extended or adjusted under 35 U.S.C. 154(b) by 173 days.

(21) Appl. No.: 16/491,743

(22) PCT Filed: Mar. 6, 2018

(86) PCT No.: PCT/AT2018/050002
§ 371 (c)(1),
(2) Date: Sep. 6, 2019

(87) PCT Pub. No.: WO2018/161100
PCT Pub. Date: Sep. 13, 2018

(65) Prior Publication Data
US 2020/0031574 A1    Jan. 30, 2020

(30) Foreign Application Priority Data

Mar. 7, 2017   (AT) .............................. A 60018/2017

(51) Int. Cl.
*B65G 1/04*   (2006.01)
(52) U.S. Cl.
CPC .......... *B65G 1/0435* (2013.01); *B65G 1/0414* (2013.01)
(58) Field of Classification Search
CPC ............................ B65G 1/0414; B65G 1/0435
(Continued)

(56) References Cited

U.S. PATENT DOCUMENTS 3,213,993 A    10/1965 Long
4,690,602 A *   9/1987 Castaldi ............... B65G 1/0435
                                                     414/280
(Continued)

FOREIGN PATENT DOCUMENTS

AT          515565 A1   10/2015
DE        29715820 U1   10/1997
(Continued)

OTHER PUBLICATIONS

Espacenet English language Abstract for EP 0937660, Mantec Consulting AG, Aug. 25, 1999.

*Primary Examiner* — Saul Rodriguez
*Assistant Examiner* — Willie Berry, Jr.
(74) *Attorney, Agent, or Firm* — Tiajoloff & Kelly LLP

(57) ABSTRACT

A storage and retrieval device storing and retrieving stored goods in and from rack compartments with shelf surfaces storing the stored goods and load-transferring rack guides extending in storing and retrieving direction. A receiving head has a lifting device for the stored goods and a load-bearing apparatus displaceable along the rack compartments. A conveyer moves the receiving head along the rack guides and has at least one shear-resistant traction apparatus that engages the receiving head and can be pushed out into one of the rack guides. The lifting device of the receiving head can be moved under the stored goods and has at least one lifting bar extending in the direction of the rack guides and is adjustable in height by deflecting gears distributed over the length of lifting bar that are acted upon in the direction of the rack guides.

19 Claims, 8 Drawing Sheets

(58) Field of Classification Search
USPC .......................................................... 414/282
See application file for complete search history.

(56) References Cited

U.S. PATENT DOCUMENTS

| | | | |
|---|---|---|---|
| 9,725,238 B2 | 8/2017 | Mathys et al. | |
| 2011/0014018 A1* | 1/2011 | van Ooyen | B65G 1/04 |
| | | | 414/280 |
| 2014/0056672 A1 | 2/2014 | Mathys et al. | |
| 2017/0203918 A1 | 7/2017 | Aschauer | |

FOREIGN PATENT DOCUMENTS

| | | |
|---|---|---|
| DE | 20008073 U1 | 10/2001 |
| DE | 20107533 U1 | 11/2001 |
| DE | 102013013274 A1 | 2/2015 |
| EP | 0937660 A2 | 8/1999 |
| EP | 0209654 A1 | 9/2009 |
| EP | 2096054 A1 | 9/2009 |
| GB | 2089333 A | 6/1982 |
| GB | 2089333 B | 6/1982 |
| WO | 8103653 A1 | 12/1981 |
| WO | 2010/090516 A1 | 8/2010 |

* cited by examiner

STORAGE RACK FOR STORED GOODS AND STORAGE AND RETRIEVAL DEVICE FOR THE STORAGE AND RETRIEVAL OF THE STORED GOODS

FIELD OF THE INVENTION

The invention relates to a storage rack for stored goods and a storage and retrieval device for storing and retrieving the stored goods in and from rack compartments, having shelf surfaces for storing the stored goods and load-transferring rack guides extending in the storage and retrieving direction for a receiving head provided with a lifting device for the stored goods and with a load-bearing means which can be displaced along the rack compartments by means of the storage and retrieval device and which has the receiving head and a conveyor which moves the receiving head along the rack guides and consists of at least one shear-resistant traction means which engages on the receiving head and can be pushed out into one of the rack guides.

In order to make better use of the available storage space and to create simple conditions for storing and retrieving pallets, it is well known (WO 81/03653 A1) that pallets are provided with laterally projecting supports, which are used to place them on consoles arranged on the shelf. On the inside of the consoles, facing the pallets, there are lanes for one trolley each traveling underneath the supports, which has a pallet support that can be lifted by means of lifting cylinders, so that the supports with the pallets can be lifted from the consoles and removed from the rack compartments by means of push chains that can be coupled to the trolleys depending on the direction of travel.

These well-known devices have the advantage over designs (WO 2010/090516 A1, AT 515 565 B1, US 2014/0056672 A1), in which the stored goods are driven underneath with the aid of telescopic arms and then lifted for retrieval, that the weight loads during lifting do not have to be taken up by a load-bearing means via the telescopic arms, but are transferred directly to the shelf consoles via the trolleys. A disadvantage, however, is the arrangement of lifting cylinders, which increase the entry cross-sections required for the trolleys. Although the supports protruding sideways above the pallets create space for the lane between the consoles and the pallet of the rack compartment immediately below, this space can then no longer be used to accommodate pallets. In addition, the requirements for the pallets also take away storage space.

If a unilaterally rollable chain (EP 2 096 054 A1) is used to store and retrieve stored goods, with which the stored goods are gripped beneath so that they can then be lifted and conveyed from a rack compartment, the occurring loads must in turn be transferred via the conveyor arm formed by the chain.

Finally, direct load transfer to the rack compartments is known from EP 0 937 660 A2, in which a gripper is provided in the form of a freely movable chain which moves beneath the stored goods and carries barb-like elements which permit free gripper movement relative to the stored goods in one direction but cause the stored goods to be entrained in the opposite direction of movement. Since the gripper elements intended for opposite directions of movement are provided at both ends of the chain, the chain must be pushed out with different ends into the shelves to store and retrieve the stored goods. In addition, it is necessary to provide the stored goods with carriers in the floor area in order to ensure that the stored goods are entrained in a form-fit manner.

SUMMARY OF THE INVENTION

The invention is therefore based on the object of designing a storage rack with a storage and retrieval device for the storage and retrieval of stored goods in such a way that space-saving storage with comparatively simple design means can be ensured.

Based on a storage rack and a storage and retrieval device of the type described at the beginning, the invention solves the object set in that the lifting device of the receiving head which can be moved under the stored goods comprises at least one lifting bar which extends in the direction of the rack guides and which is mounted on a longitudinal beam so as to be adjustable in height by means of deflecting gears which are distributed over the length of the lifting bar and can be acted upon in the direction of the rack guides.

In order to be able to store the stored goods in the shelves at a small lateral distance, the stored goods have to be passed under by the receiving head, which in turn requires the lowest possible overall height for the receiving head in order to make advantageous use of space. These requirements can be advantageously met by lifting bars running in the direction of the rack guides, if these lifting bars are lifted with the aid of deflecting gears distributed over their length in relation to a longitudinal beam and the deflecting gears are loaded in the direction of the rack guides, because the overall height of such deflecting gears required for the respective stroke can be kept comparatively small, especially since with the given synchronous actuation of the deflecting gears a separate lifting guide for the lifting bar can be omitted, which not only simplifies the design but also saves overall height.

Due to the loading of the deflecting gears in the direction of the rack guides, there is also room for larger travel distances for the operation of the deflecting gears, which is important for the storage and retrieval of heavier stored goods in particular. In addition, the drive for the deflecting gears can be mounted upstream of the lifting bar in the storage direction and is then not decisive for the overall height enabling the stored goods to be driven under. The deflecting gears distributed over the length of the lifting bars each form load-bearing bearing points for the lifting bars, so that comparatively thin lifting bars can also be used for heavy stored goods with a corresponding distribution density of the deflecting gear units and the length of the lifting bars depends only on the dimensions of the load-bearing means. The loads of the lifting bars caused by the stored goods are transferred to the rack storage system or to the load-bearing means via the longitudinal beams adapted to the length of the lifting bars, irrespective of the length of the lifting bars. With correspondingly long lifting bars, it is also possible to store and retrieve several storage goods arranged one behind the other in the direction of the rack guides at the same time.

Particularly simple design conditions are achieved when the lifting bar can be moved relative to the longitudinal beam in the direction of the rack guides for its actuation. A relative displacement of the lifting bar in relation to the longitudinal beam not only creates advantageous conditions for a low overall height of the receiving head, but also requires an independent, constructive synchronization of the deflecting gears, which are arranged between the longitudinal beam and the lifting bar, irrespective of whether this relative longitudinal displacement is the result of an actuation of the deflecting gears or takes place to actuate the deflecting gears. Particularly simple design conditions result in this context if the deflecting gears are designed as wedge gears.

In contrast to storage goods which even allow the receiving head to travel beneath them, as is the case with pallets for example, storage goods with a continuous floor require rack guides lowered in relation to the shelf surface of the rack compartments.

For this purpose, the rack guides can form guide rails running below the shelf surface of the rack compartments for the at least one longitudinal beam of the receiving head, so that when the receiving head is pushed out of the load-bearing means, the longitudinal beam engages in the respective guide rail of the rack compartment and can be moved along this guide rail under the floor of the stored goods.

Although it is possible for small stored goods to be picked up using a single lifting bar, a receiving head with two or more lifting bars will generally be required in order to be able to pick up the stored goods in a tilt-resistant manner on the one hand and to provide sufficient support for the floor of the stored goods on the other, so that even stored goods with otherwise insufficiently load-bearing floors, such as cartons, for heavier goods can be stored and retrieved safely without the aid of load-bearing supports.

As already mentioned, the drive for the deflecting gears can be mounted upstream of the lifting bars in the bearing direction, so that the overall height of this drive can be freely selected to a large extent. It is therefore quite possible to provide sufficient space on the receiving head for at least one electric motor for actuating the deflecting gears and for an electric energy storage device for supplying energy to the electric motor, without endangering the low overall height in the area of the lifting bar required for moving beneath the stored goods.

In principle, it is possible to displace the receiving head, even if it has several parallel lifting bars, along the rack guides by means of a conveyor with a single shear-stiff traction means. In general, however, it is advantageous to assign a separate shear-resistant traction means, preferably a push chain drive, to each longitudinal beam of the receiving head accommodating a lifting bar. In this case, the prerequisites are also given for the deflecting gears to be acted upon by a longitudinally adjustable, shear-resistant auxiliary traction means which is connected to the shear-resistant traction means of the conveyor and which is longitudinally adjustable in relation to these traction means.

If the load-bearing means is mounted so that it can be pivoted about a vertical axis, the load-bearing means having only one receiving head can be used to operate the rack compartments on both sides of a storage aisle and can be connected in any direction to a retrieving and transfer device for the goods to be stored and retrieved. It is understood that the load-bearing means can also have several receiving heads with separate conveyors in order to be able to meet more complex requirements.

In order to be able to take advantage of the advantages according to the invention for the goods of individual layers in the case of stored goods stacked on pallets, intermediate layers with longitudinal beam guides corresponding to the rack guides can be provided between the individual layers of goods, so that the receiving head can drive under the goods in the intended longitudinal beam guides of the intermediate layers. When the goods are lifted by the lifting bars, the longitudinal beams of the receiving head are supported on the remaining stack.

BRIEF DESCRIPTION OF THE DRAWINGS

The subject matter of the invention is shown in the drawings by way of example, wherein.

DESCRIPTION OF THE PREFERRED EMBODIMENTS

Figure 1A:
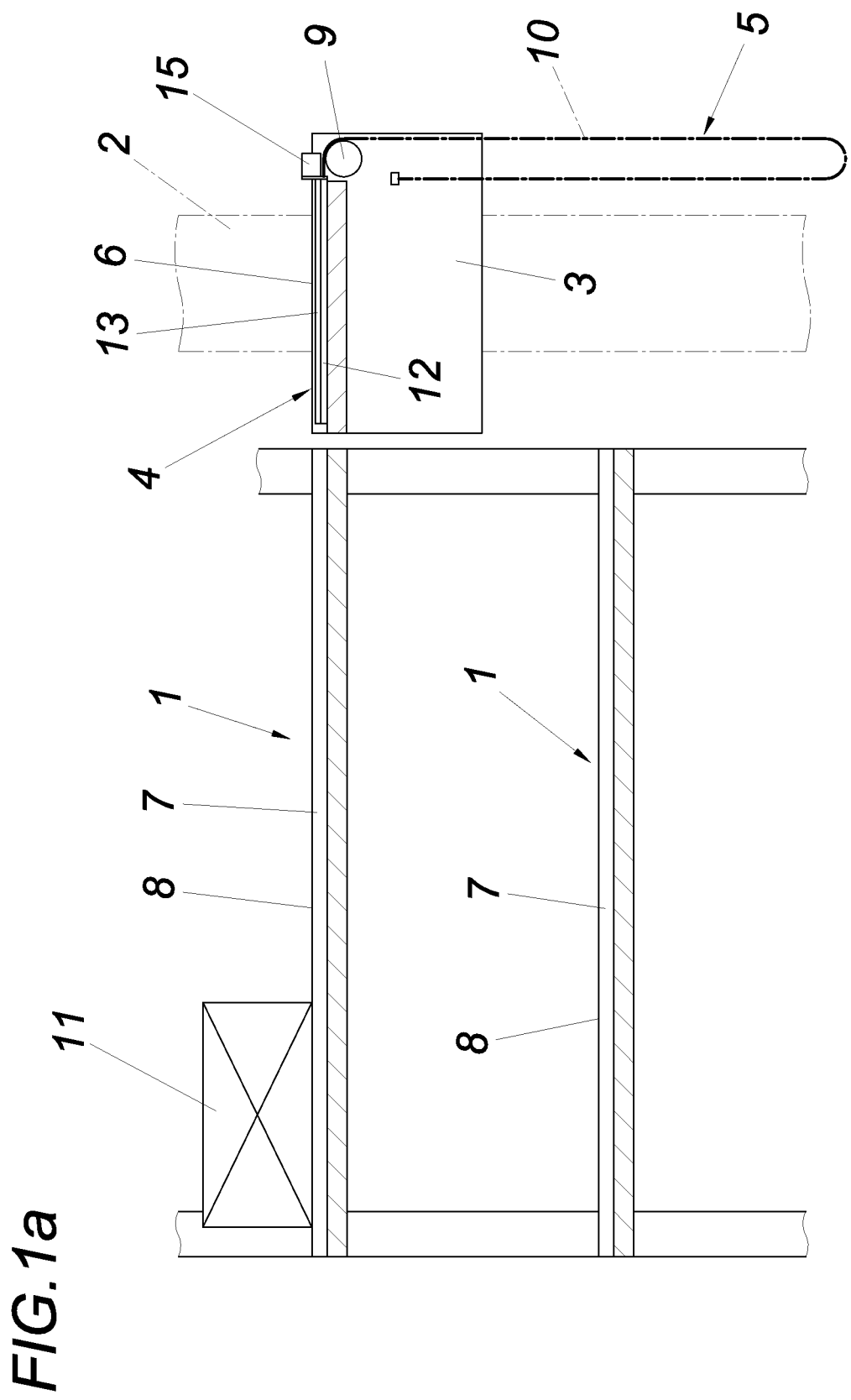
FIGS. 1a to 1d show a storage rack and a storage and retrieval device according to the invention in different working positions in a schematic section along a rack guide.

FIGS. 1a to 1d schematically show a storage rack with several rack compartments 1 and a storage and retrieval device 2 with a load-bearing means 3, which can be moved along the rack compartments 1 with the aid of the storage and retrieval device 2. The load-bearing means 3 comprises at least one receiving head 4, which can be pushed out by a conveyor 5 from a displacement guide 6 of the load-bearing means 3 into a rack guide 7 below the shelf surface 8 of the rack compartments 1. Conveyor 5 comprises at least one shear-resistant traction means 10 guided around a drive wheel 9, for example a push chain, which is, however, not mandatory. It is merely necessary to ensure that, with the aid of the traction means 10, which can be removed from a traction means storage and can be rolled on one side, the receiving head 4 can be pushed into rack compartment 1 with and without a stored good 11 along the rack guide 7 under a shear load of the traction means 10, which generally requires a stop-limited shear position of the traction means 10.

The receiving head 4 consists of at least one longitudinal beam 12 and a lifting bar 13 mounted on the longitudinal beam 12, which can be lifted relative to the longitudinal beam 12 by means of a deflecting gear 14 as a lifting device. The deflecting gear 14, distributed over the length of the lifting bar 13, is acted upon by a drive 15 in the direction of the rack guide 7.

Figure 1B:
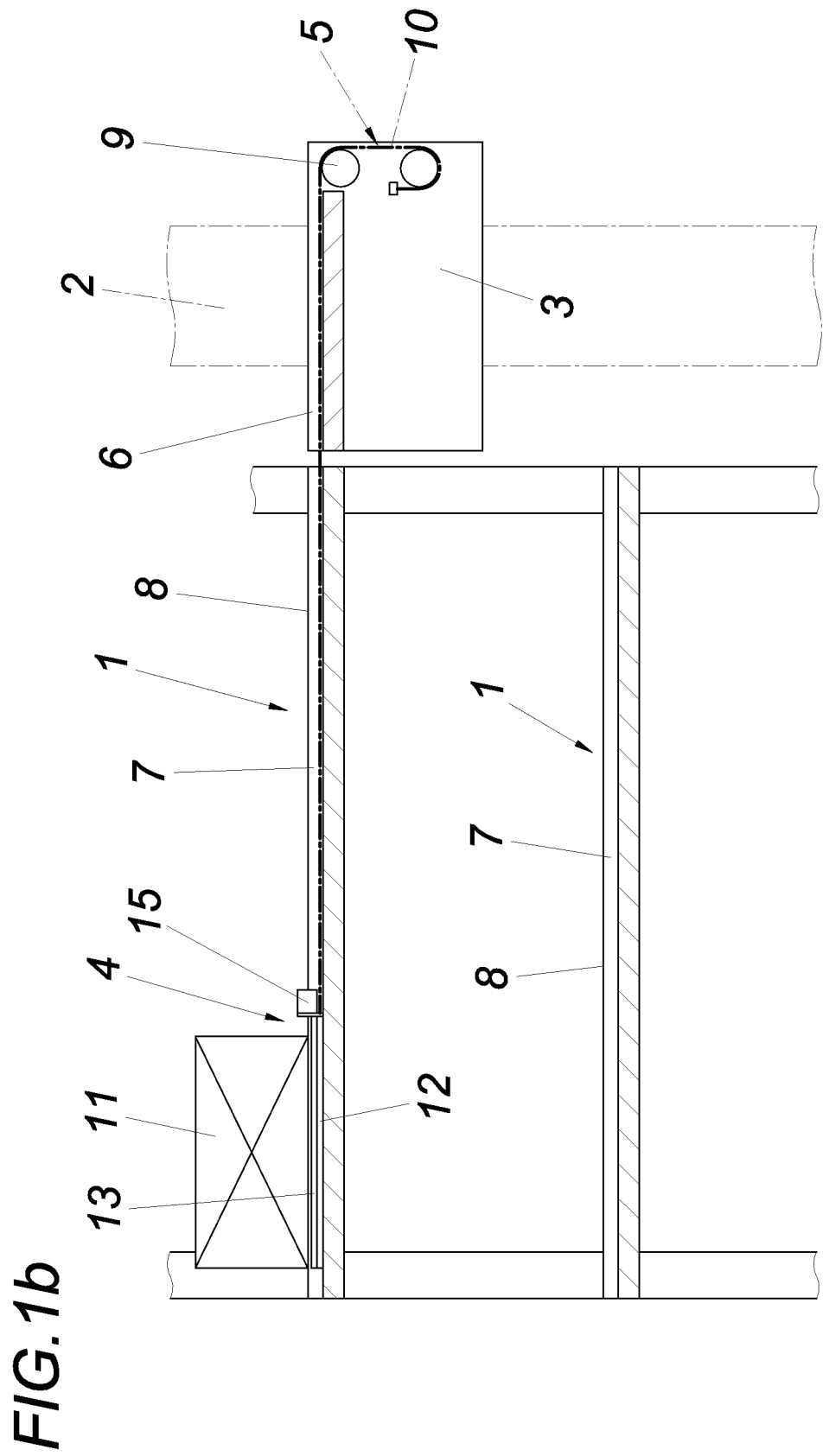
Figure 1C:
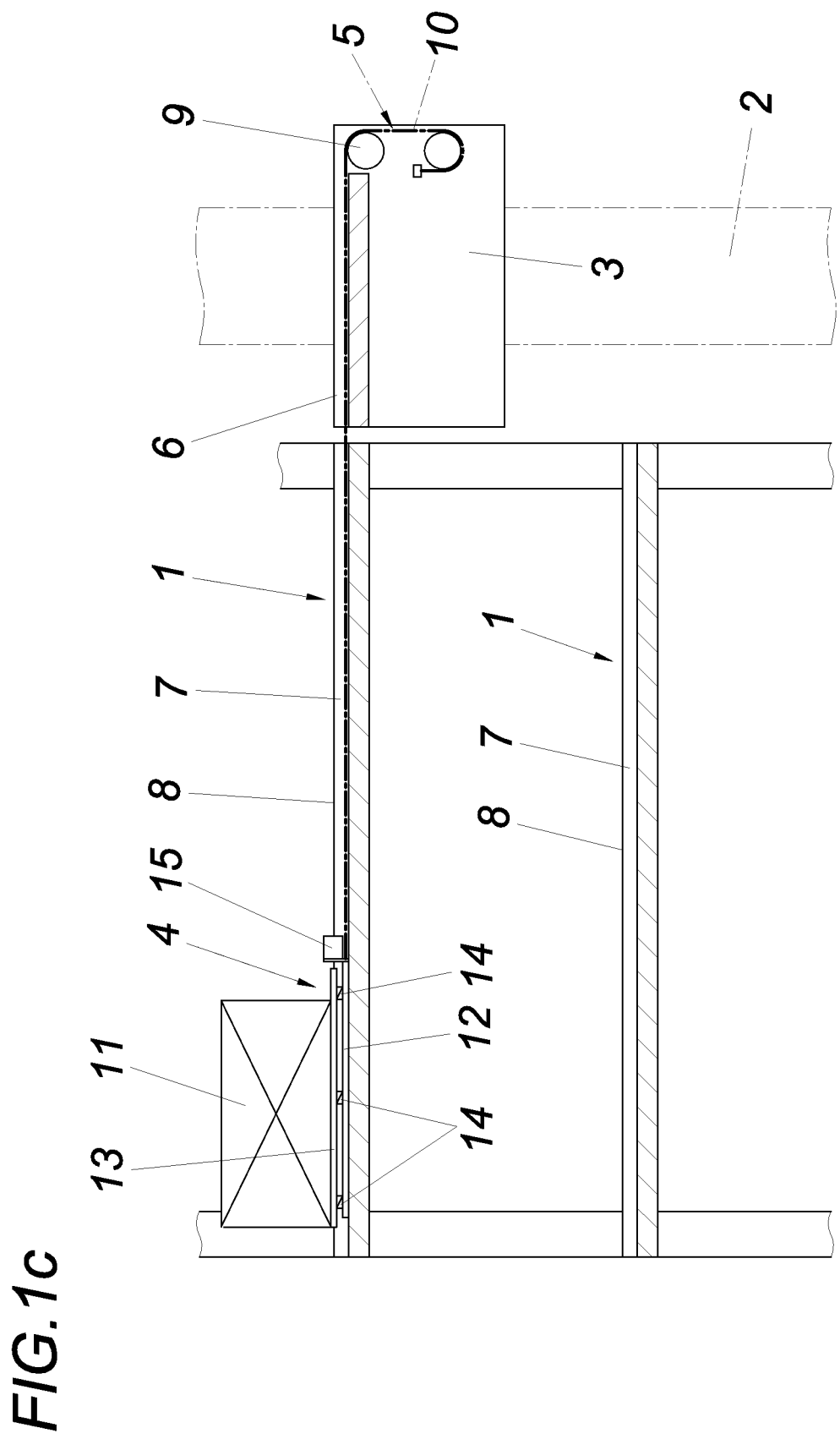
Figure 1D:
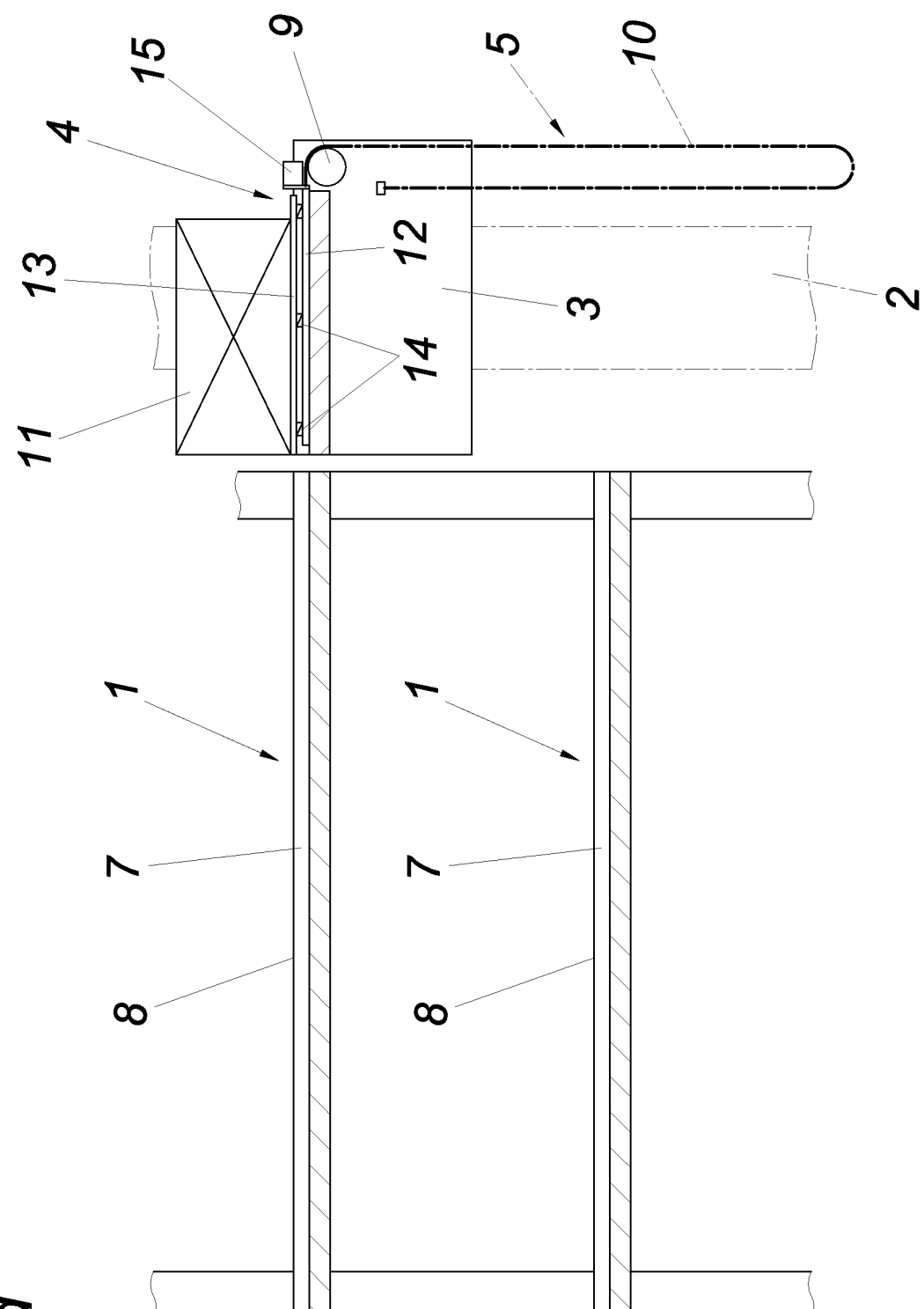

In order to be able to remove a stored good 11 from a shelf 1, the load-bearing means 3 is first aligned with the rack compartment 1 using the storage and retrieval device 2 so that the displacement guide 6 of the load-bearing means 3 is aligned with the rack guide 7 belonging to the stored good 11 to be removed from storage, so that the at least one longitudinal beam 12 of the receiving head 4 is pushed out of the displacement guide 6 of the load-bearing means 3 into the rack guide 7 by the strand of the traction means which is shear-resistant between the longitudinal beam 12 and the drive wheel 9, and can be conveyed along the rack guide 7 in accordance with FIG. 1b under the stored good 11. When the drive 15 for the deflecting gears 14 is actuated, the stored good 11 is lifted off by the lifting bar 13 from the shelf surface 8 of the rack compartment 1, as shown in FIG. 1c, and can then be pulled out of the rack compartment 1 along the rack guide 7 with the aid of the traction means 10, which is now under tension, in order finally to be accommodated by the load-bearing means 3 in accordance with FIG. 1d. The load of the receiving head 4 formed by the stored goods 11 is transferred via the rack guide 7 to the storage rack and via the displacement guide 6 to the load-bearing means 3.

The storage of stored goods 11 takes place analogously in reverse order. In order to be able to operate a storage rack on the opposite side of the aisle, which is not shown in FIGS. 1a to 1d, the load-bearing means 3 can be mounted so as to be pivotable about a vertical axis.

Figure 2:
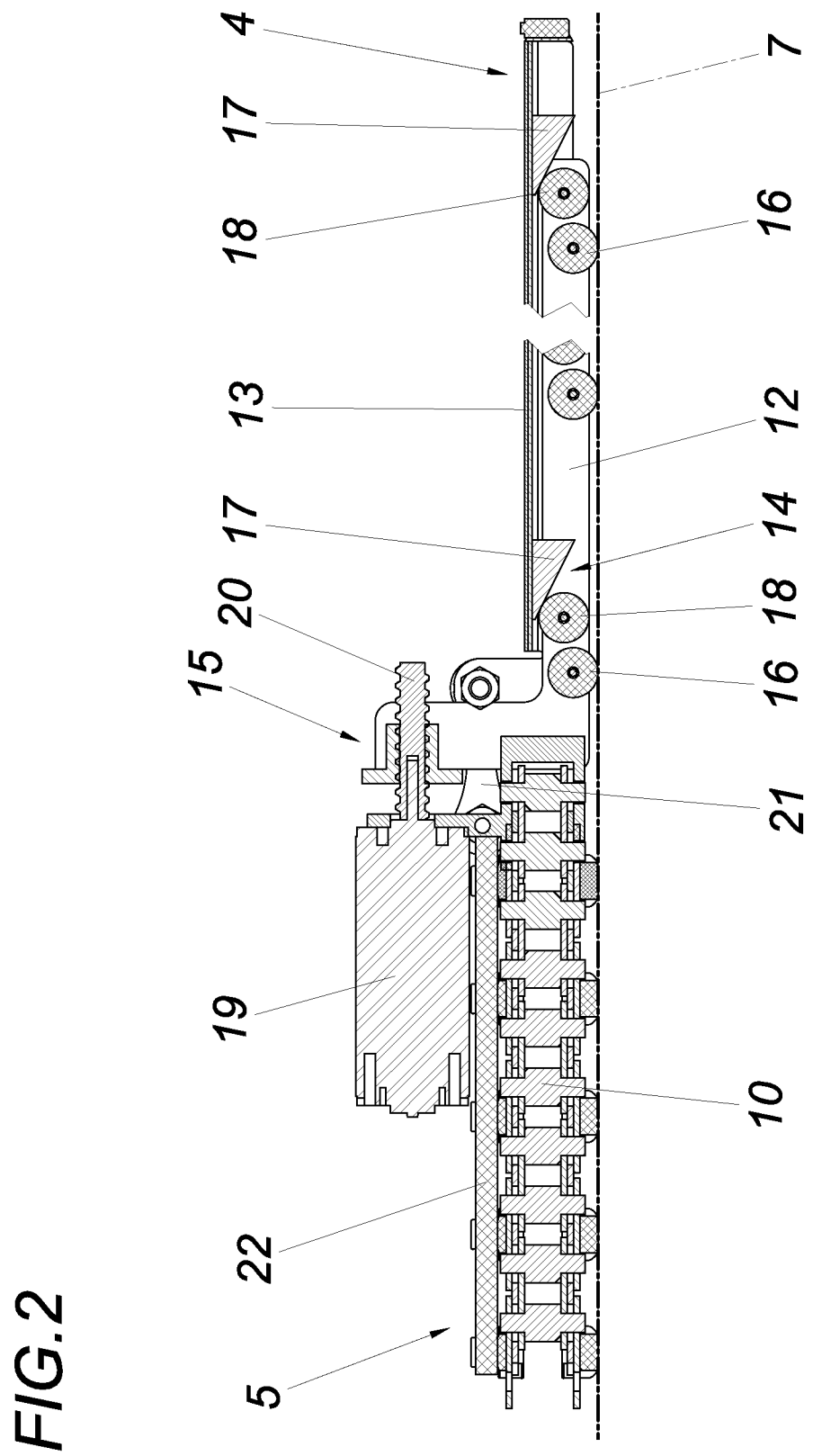
FIG. 2 shows a receiving head in a longitudinal section on a larger scale.

FIG. 2 shows by way of example an embodiment of a receiving head 4. A lifting bar 13 is mounted on the longitudinal beam 12, which is supported on a rack guide 7 via rollers 16 and is drive-connected to the shear-resistant traction means 10 designed as a push chain, with the interposition of deflecting gears 14, which are designed as wedge gears and each comprise a wedge 17 connected to the lifting bar 13 and a run-on roller 18 associated with the longitudinal beam 12 and cooperating with the wedge 17 to reduce friction.

In order to move the lifting bar 13 relative to the longitudinal beam 12, the drive 15 has an electric motor 19 with a spindle drive 20, which is connected to the end of the traction means 10 in a shear-proof manner and which shifts the longitudinal beam 12 in the direction of the rack guide 7. Since the lifting bar 13 is connected to the electric motor 19 in a shear-resistant manner by a link 21, an adjustment of the longitudinal beam 12 away from the traction means 10 requires that the run-on rollers 18 run under the wedges 17 and that the lifting bar 13 is thereby raised relative to the longitudinal beam 12 without itself being displaced in the direction of the rack guide 7, which is of importance with regard to an exact positioning of the lifting bar 13 relative to the stored good 11 to be accommodated. The power supply of the electric motor 19 and its control is ensured by a cable harness 22 routed along the traction means 10, but can also be achieved by an energy storage device provided in the area of the electric motor 11.

Figure 3:
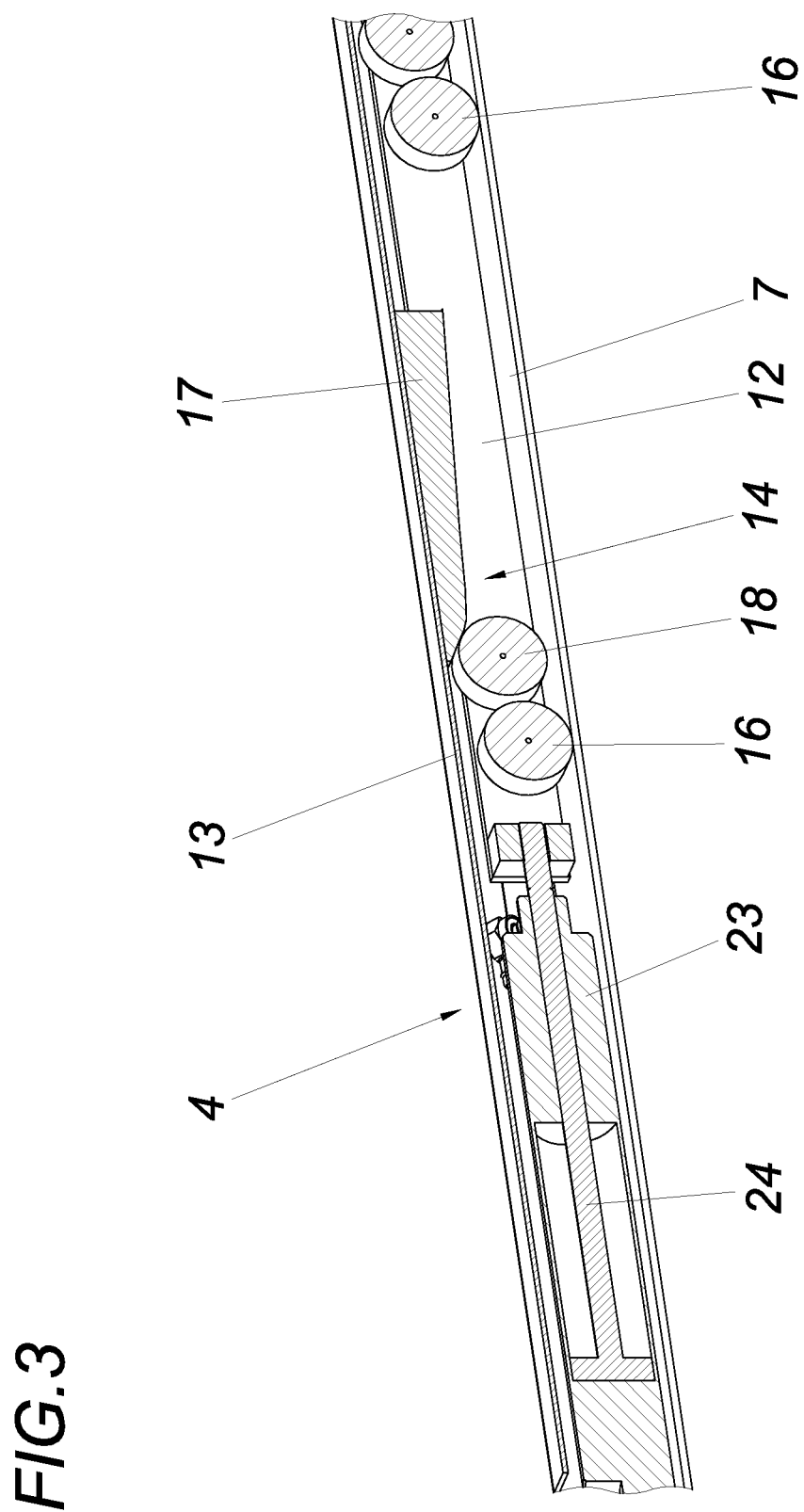
FIG. 3 shows a design variant of a receiving head in sections in the area of a deflecting gear in a sectional diagram.

According to FIG. 3, the receiving head 4 has deflecting gears 14 in the form of the wedge gears already described in connection with FIG. 2, but the drive 15 for actuating these wedge gears is designed differently. An actuating cylinder 23 is connected to the end of the shear-resistant traction means 10, the piston rod 24 of which acts on the longitudinal beam 12 and which, when the actuating cylinder 23 is acted upon, is thus displaced in relation to the lifting bar 13 which is held in place on the actuating cylinder 23 by a link, as a result of which the lifting bar 13 undergoes a height displacement. This design ensures that the drive 15 comes to lie within the rack guides 7.

Figure 4:
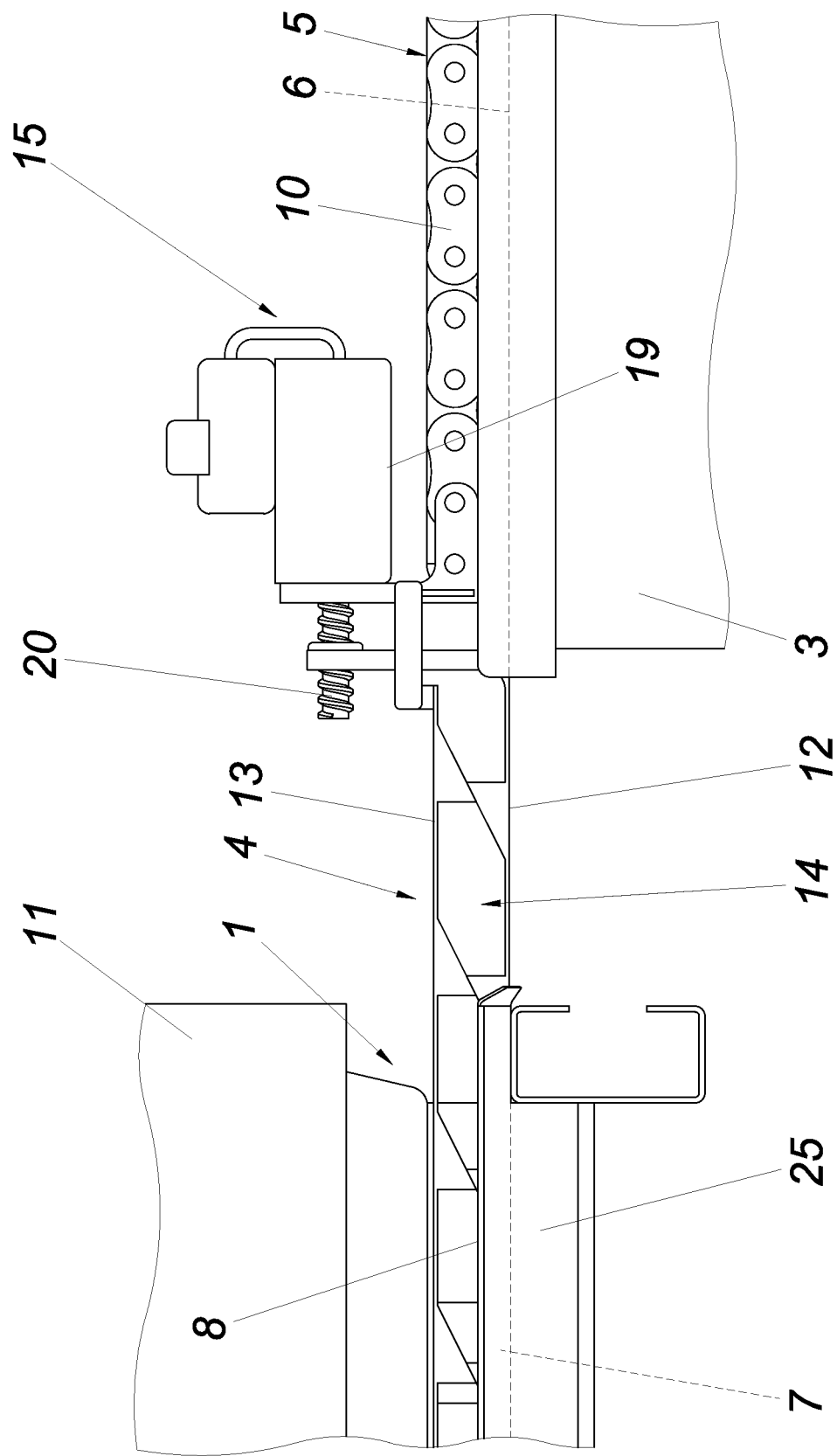
FIG. 4 shows the receiving head in a schematic side view during the underrun of a storage item stored in a rack compartment on a larger scale.
Figure 5:
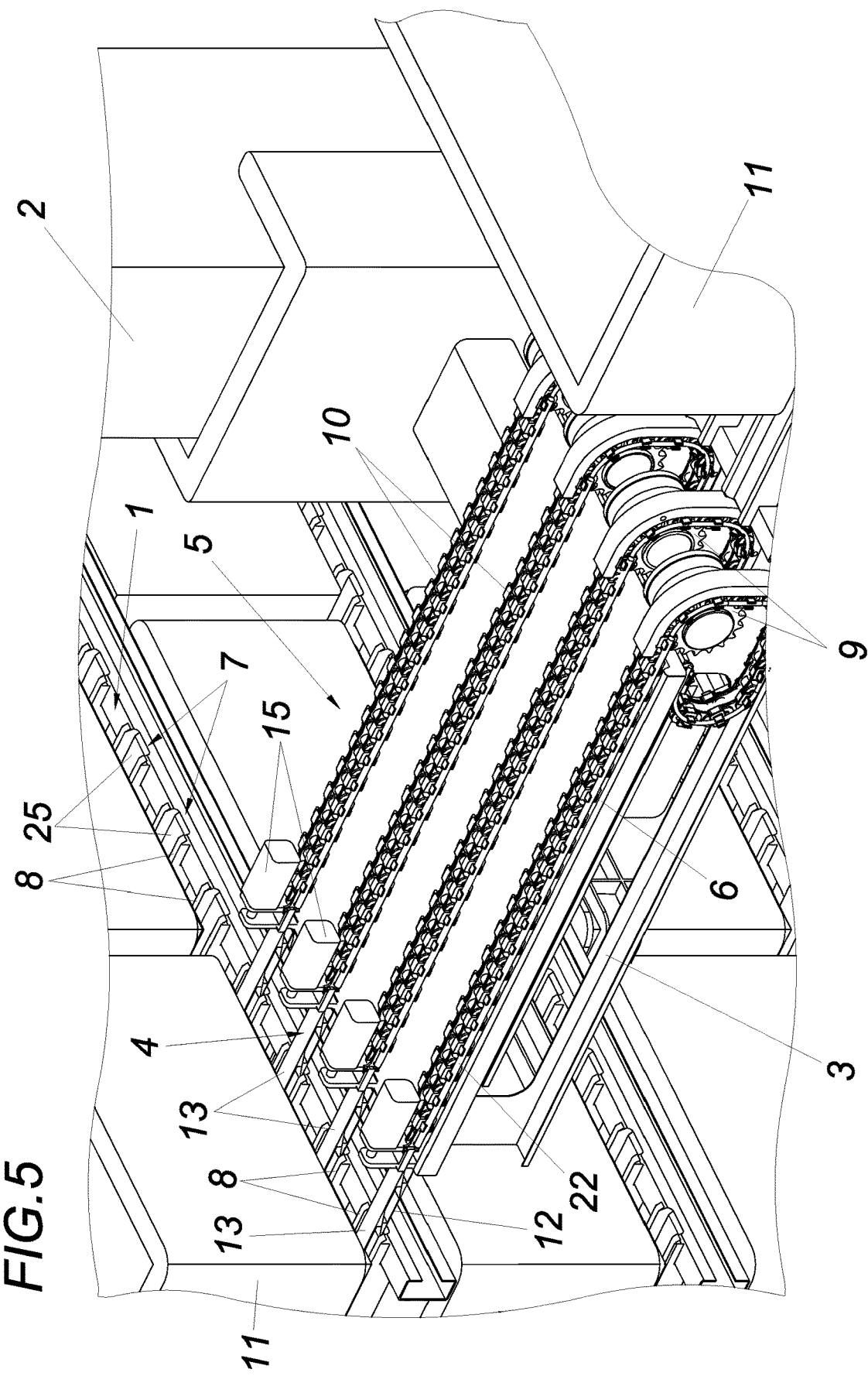
FIG. 5 shows the receiving head according to FIG. 4 in a diagram.

FIGS. 4 and 5 show the removal of a stored good 11 from storage on the load-bearing means 3 or the storage of the stored good 11 in a rack compartment 1. The stored good 11 rests on the lifting bars 13 of a receiving head 4 raised into the conveyor position, which are supported by the deflecting gears 14 in the form of wedge gears on the associated longitudinal beams 12. According to the embodiment example shown, the receiving head 4 comprises four longitudinal beams 12 each carrying a lifting bar 13, which can each be moved in the direction of the rack guides 7 by means of a shear-resistant traction means 10. These rack guides 7 are formed by separate guide rails 25 in rack compartments 1.

The drive 15 for the deflecting gears 14 comprises for each longitudinal beam 12 a separate electric motor 19 with a spindle drive 20 according to FIG. 2. Depending on the drive direction of the conveyor 5 comprising the traction means 10 with the drive wheels 9, the stored good 11 resting on the lifting bars 13 of the receiving head 4 is stored in rack compartment 1 or removed from rack compartment 1. When the storage position is reached, the goods 11 to be stored are parked on the shelf surfaces 8 of rack compartment 1 by lowering the lifting bars 13.

The invention claimed is:

1. A storage system comprising:
   a storage rack for stored goods having rack compartments with shelf surfaces configured to receive the stored goods; and
   a storage and retrieval device storing and retrieving the stored goods in and from said rack compartments;
   said storage rack including load-transferring rack guides extending in a storing and retrieving direction;
   the storage and retrieval device having a load-bearing apparatus with a receiving head that is guided by the rack guides and supported so as to be displaceable along the rack compartments by the storage and retrieval device;
   said receiving head having a lifting device configured to raise the stored goods;
   said load-bearing apparatus comprising a conveyor that moves the receiving head and the lifting device along the rack guides and that has at least one shear-resistant traction apparatus that engages the receiving head, and wherein the load-bearing apparatus is supported so as to extend into one of the rack guides; and
   wherein the lifting device of the receiving head is configured to be moved under at least one of the stored goods and comprises a lifting bar that extends in the storing and retrieving direction of the rack guides and is mounted on a longitudinal support with deflecting gears adjusting height of the lifting bar and being distributed over a length of the lifting bar;
   said deflecting gears being configured to elevate or lower the lifting bar over the length thereof and said one of the stored goods resting thereon responsive to being acted upon in the storing and retrieving direction of the rack guides.

2. A storage system according to claim 1, wherein the lifting bar is displaced for its actuation in the storing and retrieving direction of the rack guides relative to a longitudinal beam.

3. A storage system according to claim 2 wherein the deflecting gears comprise wedge gears.

4. A storage system according to claim 2, wherein the rack guides form guide rails extending below the shelf surface of the rack compartments and guiding the longitudinal beam of the receiving head.

5. A storage system according to claim 4, wherein the receiving head has one or more additional lifting bars, and wherein said lifting bars are each supported so as to be displaceable in respective guide rails of the rack guide.

6. A storage system according to claim 2, wherein the deflecting gears are acted upon by at least one electric motor and the receiving head has an electric energy storage device supplying electric energy to the electric motor.

7. A storage system according to claim 2, wherein the deflecting gears are acted upon by a shear-resistant auxiliary traction apparatus that is drive-connected to the shear-resistant traction apparatus of the conveyor and that is longitudinally adjustable relative to the conveyor.

8. A storage system according to claim 1, wherein the deflecting gears comprise wedge gears.

9. A storage system according to claim 8, wherein the rack guides form guide rails extending below the shelf surface of the rack compartments and guiding the longitudinal beam of the receiving head.

10. A storage system according to claim 9, wherein the receiving head has one or more additional lifting bars, and wherein said lifting bars are each supported so as to be displaceable in respective guide rails of the rack guide.

11. A storage system according to claim 8, wherein the deflecting gears are acted upon by at least one electric motor and the receiving head has an electric energy storage device supplying electric energy to the electric motor.

12. A storage system according to claim 8, wherein the deflecting gears are acted upon by a shear-resistant auxiliary traction apparatus that is drive-connected to the shear-resistant traction apparatus of the conveyor and that is longitudinally adjustable relative to the conveyor.

13. A storage system according to claim 1, wherein the rack guides form guide rails extending below the shelf surface of the rack compartments and guiding the longitudinal beam of the receiving head.

14. A storage system according to claim 13, wherein the receiving head has one or more additional lifting bars, and wherein said lifting bars are each supported so as to be displaceable in respective guide rails of the rack guide.

15. A storage system according to claim 1, wherein the deflecting gears are acted upon by at least one electric motor and the receiving head has an electric energy storage device supplying electric energy to the electric motor.

16. A storage system according to claim 1, wherein the deflecting gears are acted upon by a shear-resistant auxiliary traction apparatus that is drive-connected to the shear-resistant traction apparatus of the conveyor and that is longitudinally adjustable relative to the conveyor.

17. A storage system according to claim 1, wherein the load-bearing apparatus is supported for pivoting movement about a vertical axis.

18. A storage system according to claim 1, wherein the load-bearing apparatus has one or more receiving heads each with a respective conveyor.

19. A storage system according to claim 1, wherein the stored goods are stacked on pallets so that layers are formed between individual stored goods, and intermediate layers with longitudinal beam guides corresponding to the rack guides are provided in the individual layers between the stored goods.

\* \* \* \* \*